M. A. DROITCOUR.
MEANS FOR CONVERTING ROTARY INTO RECIPROCATING MOTION.
APPLICATION FILED JUNE 7, 1911.

1,073,104.

Patented Sept. 16, 1913.

M. A. DROITCOUR.
MEANS FOR CONVERTING ROTARY INTO RECIPROCATING MOTION.
APPLICATION FILED JUNE 7, 1911.

1,073,104.

Patented Sept. 16, 1913.

Witnesses:

Inventor:
Michael Andrew Droitcour

UNITED STATES PATENT OFFICE.

MICHAEL ANDREW DROITCOUR, OF CHICAGO, ILLINOIS.

MEANS FOR CONVERTING ROTARY INTO RECIPROCATING MOTION.

1,073,104. Specification of Letters Patent. Patented Sept. 16, 1913.

Application filed June 7, 1911. Serial No. 631,697.

*To all whom it may concern:*

Be it known that I, MICHAEL ANDREW DROITCOUR, a citizen of the United States, residing at Chicago, county of Cook, and State of Illinois, have invented certain new and useful Improvements in Means for Converting Rotary into Reciprocating Motion, of which the following is a full, clear, and exact specification.

This invention relates to mechanism for converting rotary motion into to-and-fro rectilinear or reciprocating motion. It has more especial reference to means of this kind for utilizing rotary motion for reciprocating the bed of a printing press or like machine. In devices for this purpose the bed is driven throughout the greater part of its stroke at a constant rate of speed by suitable constant speed mechanism, and is slowed down, stopped, and started back on its return stroke at each end of its travel by reversing mechanism embodying devices giving the bed a rate of speed gradually decreasing from the maximum speed to a point of rest, and increasing from such point of rest until the maximum speed is again attained. The usual mechanism for thus slowing down, stopping and starting the bed embodies a crank and devices for converting the arcual motion of the crank into reciprocating motion, which take control of the bed at the conclusion of the printing stroke, that is, not until the impression cylinder lifts out of contact with the type surface on the bed, because inasmuch as the cylinder is usually rotated at a constant rate of speed, the type could not remain in contact therewith after the gradually decreasing speed of the bed commences, without causing damage or imperfection in the result. Consequently, in order that the speed of the motion imparted to the bed by the crank at the instant the crank takes control will be exactly equal to the speed of the motion imparted to the bed by the constant speed mechanism, the maximum speed of the converted movement of the crank has heretofore been the same as the maximum speed of the bed. This has resulted heretofore in fixing, as the points where the crank is to take control of the bed and surrender it again, the positions in its arcual line of movement where it is at right angles to the line of its converted movement, thereby consuming half of its arcual movement in reversing the bed at one end of the stroke, and the other half in reversing the bed at the opposite end of the stroke, and making it necessary for the impression to cease, as before stated, when the crank is at right angles to the line of its converted movement. The distance between the points on the bed where the cylinder touches it or the type surface when the crank reaches these positions has heretofore been the maximum length of the type or impression surface. I find, however, that without increasing the number of revolutions of the crank relative to the number of revolutions of other parts, as heretofore adopted, but by increasing the length of the crank to give it a greater speed of arcual travel than the maximum speed of travel of the bed, I am enabled to reverse the bed during a much less portion than one-half the revolution of the crank, and consequently lengthen the uniform stroke of the bed accordingly as the crank is thus lengthened, if the control of the bed by the crank be deferred until the crank reaches a point in its arcual travel where the speed of its converted movement is substantially the same as the maximum speed of the bed. This point will be more or less past the old point accordingly as the crank is more or less lengthened, and the point where the crank surrenders control will likewise be more or less in advance of the old point of surrender, so that the points in the arcual travel of the crank where the crank assumes and surrenders control will be less than 180 degrees apart.

The primary object of this invention, therefore, is to keep the bed under the control of the constant speed mechanism throughout a greater portion than 180 degrees of the arcual movement of the crank motion, and by thus increasing the length of the uniform travel of the bed, make available a longer portion thereof as a type bearing surface.

In some mechanisms of this general character the bed is reciprocated throughout the uniform part of its stroke by oppositely rotating pinions alternately engaging a straight bed rack; and in others by a single pinion constantly in engagement with the bed rack but controlled by a mutilated gear which is alternately engaged by oppositely rotating pinions. In my Patent No. 1,032,126 for improvements in bed motion for printing presses issued July 9, 1912, the latter type of mechanism is shown and claimed, and while the present invention is not restricted to any particular type of this bed driving and reversing mechanism, I have, nevertheless, elected to illustrate and describe it in this application in connection with the latter type.

It will also be understood that while the invention is described with particular reference to a printing press, it is not strictly limited thereto but is applicable to any machine where a bed or similar element is reciprocated and operates in conjunction with some other element corresponding to an impression cylinder whose coöperative relation with the bed or like element cannot be maintained longer than the time that the bed is undergoing a constant or uniform rate of speed.

The invention consists in features of novelty described herein, shown in the accompanying drawings and particularly pointed out in the claims.

In the said drawings.

Printing machines of this general type being well known in the art, the parts thereof will be indicated only conventionally.

C is a cylinder which, when the device is applied to a printing press, may be the impression cylinder or even the form cylinder, and B is the bed which ordinarily in presses of this type carries the form or type surface, but, of course, might be utilized for carrying the impression surface; and when the device is employed for other machines the elements C and B will be those parts which are designed to coöperate with one another so long as the speed of movement of the element B remains uniform or constant.

On the shaft of the cylinder C is a gear 1 which meshes with a gear 2, mounted loosely upon a counter-shaft 6. Gear 2 is driven by means of a pinion 3 mounted upon a shaft $3^a$, to which power may be applied by belt pulleys or gearing (not shown) from any suitable driver. Gear 3 meshes also with a gear 4 keyed on a crank shaft 5, hereinafter referred to.

Figure 1:
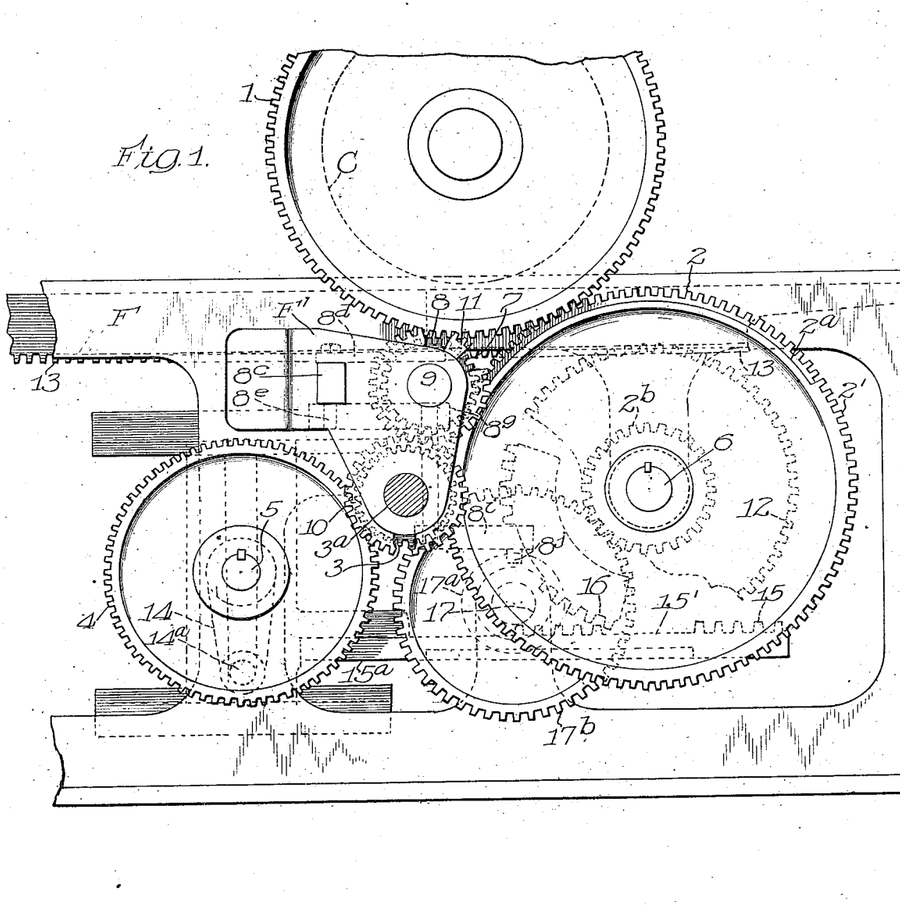
Figure 1 is a conventional side elevation of parts of a printing press provided with this invention.
Figure 2:
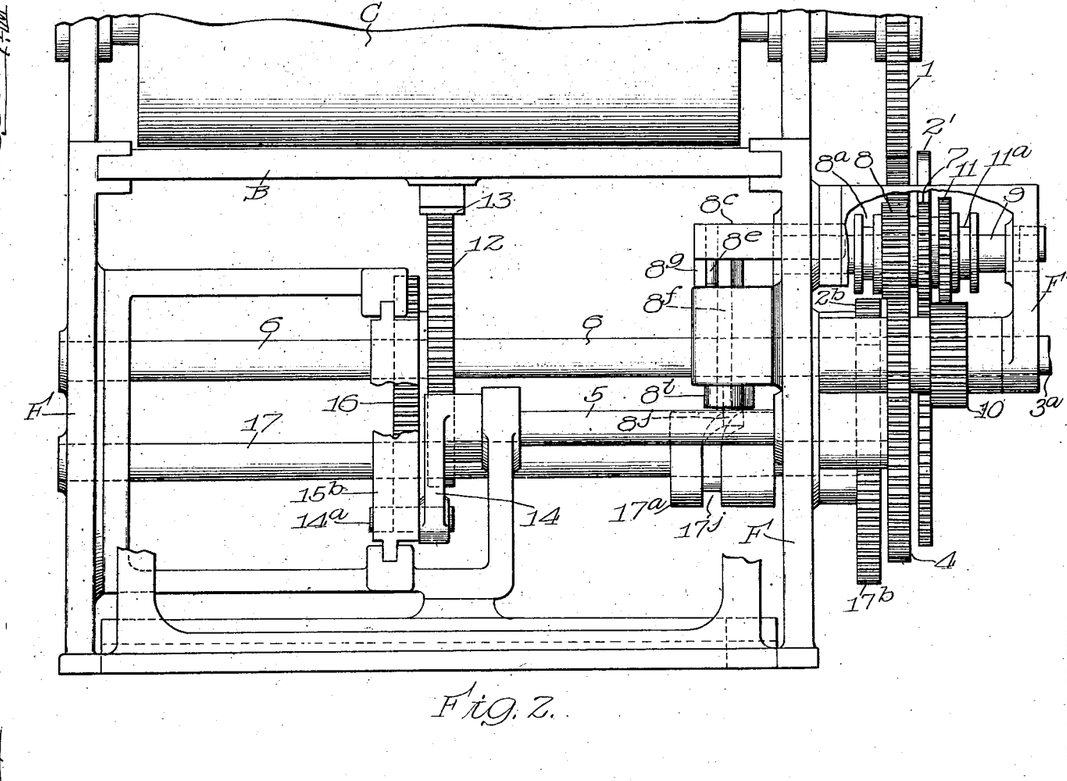
Fig. 2 is an end view of the parts shown in Fig. 1.

A short shaft 9 is mounted in one of the adjacent side frames F and a bracket F' attached thereto, (Figs. 1 and 2), and on this shaft 9 are slidably mounted three pinions 8, 7 and 11. Pinion 8 may be shifted facewise on shaft 9 by any suitable means. As shown the hub of gear 8 has an annular groove $8^a$ which is engaged by an arm $8^b$ on a bar $8^c$ which is slidably supported in the side frame F and bracket F', and is shifted at the proper time, as hereinafter explained. The pinion 8 is continually in mesh with gear 2.

The pinion 7 is rigidly connected with pinion 11 but spaced apart therefrom. Pinion 11, continually meshes with a gear 10 keyed on shaft $3^a$. The pinions 7 and 11 might be formed integral and revolve as one piece.

The pinions 7 and 11 rotate independently of pinion 8 but may be caused to move facewise on the shaft 9 by means of a finger $8^d$ on bar $8^e$ engaging an annular groove $11^a$ in the hub of pinion 11.

When shaft $3^a$ is driven in the proper direction, pinion 8 will constantly revolve clockwise; while pinions 7 and 11 will revolve counter-clockwise. In other words, gear 2 is driven by gear 3 on shaft $3^a$ constantly counter-clockwise, and in turn drives pinion 8 constantly clockwise; while gear 10 on shaft $3^a$ drives the pinion 11 (and 7) constantly counter-clockwise when the machine is in operation.

A gear 2' is keyed on shaft 6 beside gear 2. Gear 2' is alternately driven by pinions 7 and 8; which latter are shifted alternately into mesh with gear 2', as hereinafter described; and consequently as pinions 7 and 8 rotate in opposite directions the gear 2' will be alternately driven in opposite directions. The gear 2' will thus turn shaft 6 alternately in opposite directions, and drive the bed alternately in opposite directions.

On shaft 6 is keyed a gear 12 which meshes with a rack 13 on the underside of the bed B, and consequently when pinion 8 is driving gear 2', the bed will be moved in one direction; and when pinion 7 is driving gear 2' the bed will be moved in the opposite direction.

Figure 3:
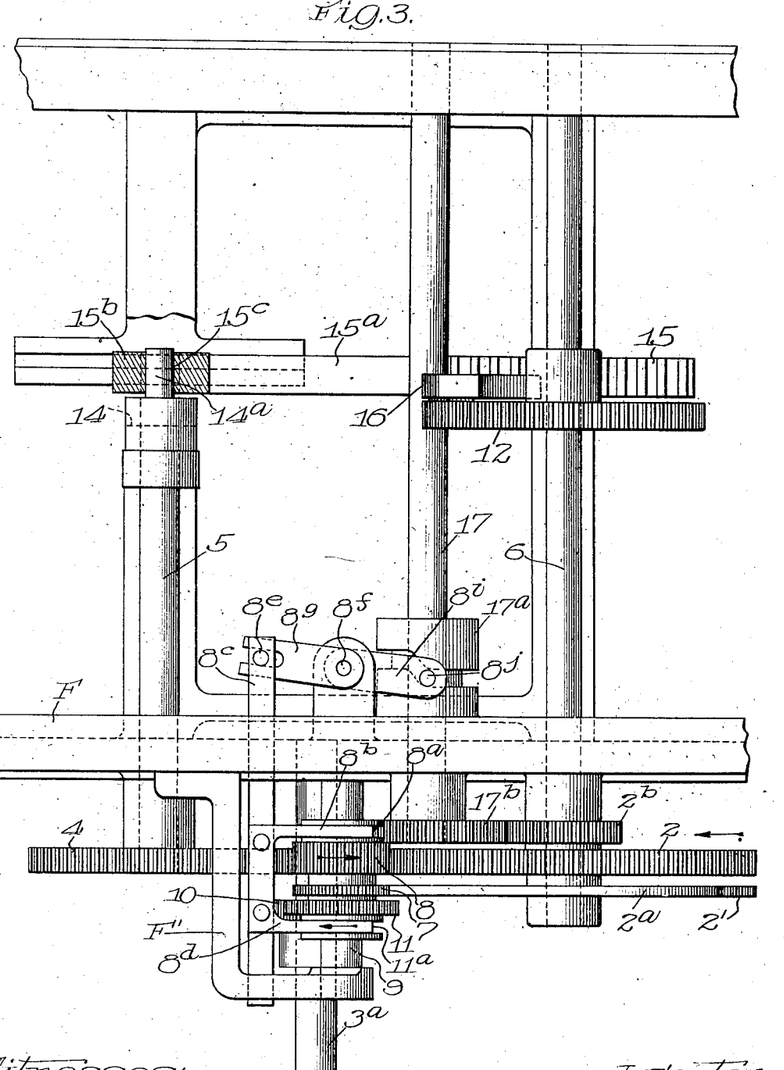
Fig. 3 is a plan view of the mechanism shown in Fig. 2.
Figure 4:
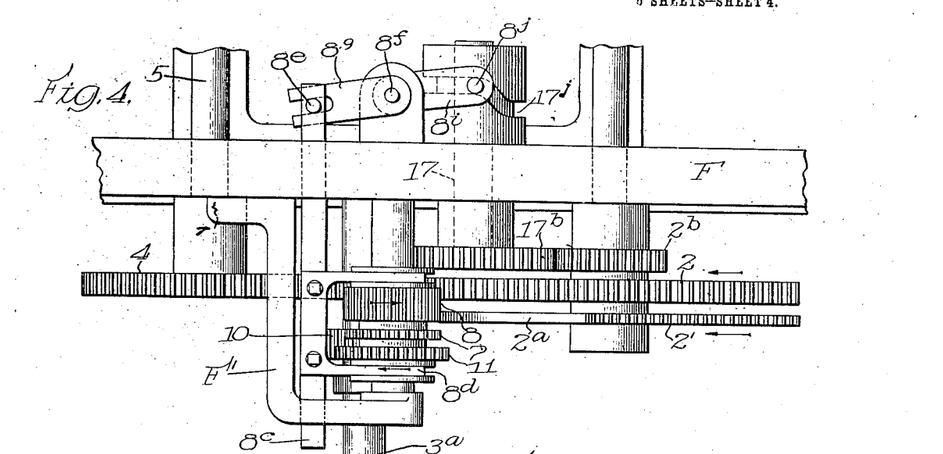
Fig. 4 is a detail view showing the pinions shifted outward to bring pinion 8 into position to engage gear 2'.

The gear 2' is a segmental gear, its teeth being removed or cut away for about, or something less than, one-third the circumference of the gear as shown at $2^a$. Pinion 8 is of such width that when the pinions 8, 7, 11 are shifted outward (to the position shown in Fig. 4) pinion 7 is out of position to mesh with gear 2' and pinion 8 is in position to mesh with both gears 2 and 2′; and consequently will transmit motion from gear 2 to gear 2′, and cause gear 2″ to rotate with, and in the same direction as, gear 2. When the pinions 7, 8, 11 are shifted inward to the position indicated in Fig. 3, pinion 8 is moved out of position to mesh with gear 2′, and pinion 7 is brought into position to mesh therewith, and consequently will drive gear 2′ in a direction opposite to the direction of rotation of gear 2. Pinion 8 preferably drives gear 2′, while the bed is making its impression stroke; and pinion 7 drives gear 2′ while the bed is making its return stroke.

While the bed is being driven from and by the rotation of gear 2′, as described, it is moved at substantially constant or uniform speed; but gear 2″ loses control of the bed when the teeth of pinion 7 or 8 enter the gap 2ª of gear 2′; and while gap 2ª is opposite pinions 7 and 8, the latter are shifted laterally on shaft 9; and at such times the bed is under the control of the reversing mechanism which slows down, stops and starts the bed in opposition directions and accelerates its speed until gear 2′ acquires the same peripheral speed as pinions 7 and 8, and when gear 2′ again comes into mesh with pinions 8, or 7, it will be turning in the proper direction and at the peripheral speed of said pinion, so that the proper pinion 8 or 7 will come into mesh with gear 2′ without clash. The pinions 7 and 8 may be shifted at the proper times during the reversal periods by any suitable means.

As shown the slide bar 8ᶜ has a pin 8ᵉ on its inner end, engaging a notch in an arm 8ᵍ on the upper end of a rock-shaft 8ᶠ, to the lower end of which shaft is attached an arm 8ⁱ having a pin or roller 8ʲ engaging a cam groove 17ʲ in a cam 17ª on a counter-shaft 17, which is driven by a gear 17ᵇ from a gear 2ᵇ beside and fast to the gear 2. During the time that the gap 2ª in gear 2′ is passing the pinions 7 and 8, the movement of the bed is reversed.

The mechanism thus described for imparting to the bed its uniform or constant speed of movement may be of the usual or any suitable construction, being specifically that which is contained in the aforesaid application. The novel mechanism for reversing the movement of the bed at the extremities of its stroke will now be described.

A toothed segment 16 may be secured to gear 12 or to the shaft 6 adjacent said gear. This segment is about 88° in extent or approximately one-fourth part of a circle and during the reversal periods is adapted to engage with a rack bar 15 on a sliding bar 15ª which is guided in suitable supports in the main frame and has a Scotch-yoke-head 15ᵇ on one end provided with a vertical slot 15ᶜ which is engaged by the aforesaid crank, the same being here embodied as a crank pin or roller 14ª on the crank arm 14 attached to the shaft 5, which is driven by gear 4 from gear 3 as before described. The parts are so arranged and organized that the segment 16 and rack 15 will have control of the gear 12 while the gear 2′ is out of mesh with both pinions 7 and 8; and the segment 16 and rack 15 surrender control of the bed when pinion 7 or 8 comes into mesh with gear 2′. In this example of the invention the parts are so proportioned that the bed driving gear 12 will be driven something over two-thirds of a revolution in one direction while gear 2′ is in mesh with pinion 7; then as the gap 2ª in the gear 2′ comes opposite pinion 7, the segment 16 comes into mesh with rack 15 and the bed is reversed by the segment and rack, which latter is receiving at that time the converted movement of the crank 14. During this period of reversal pinions 7 and 8 are shifted facewise on shaft 9 so as to bring pinion 8 into position to mesh with gear 2′, and when the segment and rack lose control of the bed, gear 2′ and pinion 8 continue to drive the bed on its impression or printing stroke until gap 2ª of gear 2′ again comes opposite pinion 8, and at which moment segment 16 and rack 15 again take control of the bed and reverse the motion thereof while the pinions 7 and 8 are being shifted to bring pinion 7 into position to mesh with gear 2′ at the end of such reversal period.

In the example shown the rack bar 15ª is caused to make three complete reciprocations for each reciprocation of the bed. In other words, shaft 5 is geared to rotate three times to every two revolutions of the shaft 6.

Figure 5:
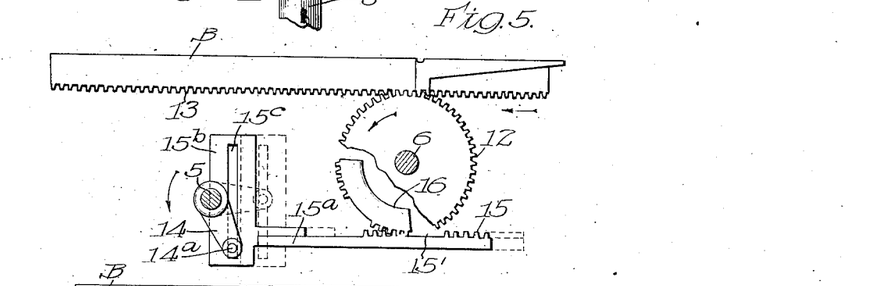
Fig. 5 is a diagrammatic view indicating the reversal of the bed at the left hand end of its stroke.

During the period of reversal of the bed the gear 2′ is slowed down, stopped and started to rotate in the opposite direction; and the pinions 7, 8, 11 are shifted so that pinion 8 is moved out of position to mesh with gear 2′; and pinion 7 is moved into position to mesh with gear 2′. And at or before the end of this reversal period the teeth of gear 2′ run into mesh with pinion 7, and consequently motion is transmitted from shaft 3ª through gear 10 and pinions 11 and 7 to gear 2′ in a direction opposite to that in which it was driven by pinion 8; and after the reversal, the gear 2′ continues to move the bed driving gear 12 at uniform speed for a little over two-thirds of a revolution of gear 2′. Then gap 2ª of gear 2′ comes opposite pinion 7 and leaves gear 2′ free of both pinions 7 and 8 for the time being. But just before gear 2′ is thus freed the segment 16 and rack 15 again take control of the bed gear 12 (Fig. 5) and (while the gear 2′ is freed from the control of pinions 7 and 8) reverse the movement of the bed driving gear 12 and the bed. While the bed is thus being reversed pinions 7, 8, 11 are shifted so as to move pinion 7 out of position to engage gear 2' and pinion 8 back into position to engage such gear 2'; so that as, or before, the segment 16 and rack 15 lose control of the bed, the gear 2' is again taken under control of gear 2 through the pinion 8; and therefore the bed driving gear 12 continues to be driven in the reverse direction until the bed nears the end of its stroke, and is again taken under control of the reversing mechanisms as before described.

Figure 6:
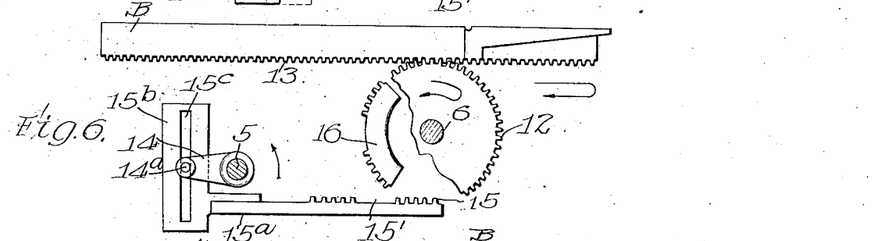
Fig. 6 is a similar view illustrating the parts in the position they assume when the bed is free from the reversing mechanism.
Figure 7:
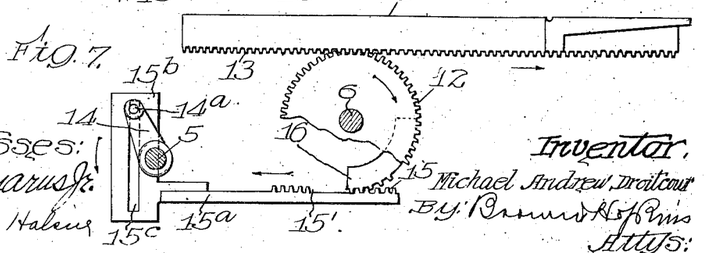
Fig. 7 is a similar view illustrating the reversal of the bed at the right hand end of its stroke.

Assuming that the bed is moving to the left during the time gear 2' is driven from the gear 2, the operation will be as follows: Just as, or before, pinion 8 enters gap 2ᵃ of gear 2', the toothed segment 16 comes into mesh with rack 15, which is then being moved in the direction in which the segment is moving and at the same rate of speed as the peripheral or pitch diameter speed of the segment, (see Fig. 5) and while gear 2' is freed from the driving control of both pinions 7 and 8, the rack 15 is reciprocated while the roller 14ᵃ is moving from the position shown in Fig. 5 to that shown in Fig. 7 or less than one-half of its arcual movement: and as rack 15 moves to the right it will, by reason of the engagement of the segment 16 therewith gradually arrest the motion of the bed driving gear 12, and consequently the bed, and bring the same to a full stop; and then the rack and segment (and consequently bed driving gear 12) are started in the reverse direction, and while the rack bar 15 is moving to the left, the speed of the bed is accelerated thereby until gear 12 drives the bed and gear 2' at the peripheral speed of pinions 7 and 8. In the meantime, cam 17ᵃ causes pinions 7, 8 and 11 to move facewise on shaft 9 until pinion 7 is brought into position to mesh with gear 2', and pinion 8 moved out of position to mesh therewith (Fig. 3), and consequently gear 2' will be driven by pinion 7, as before explained, and will propel the bed onward, in the direction in which the segment started it, with uniform speed until gears 2' and 12 have made something over two-thirds of a revolution; then the gap 2ᵃ of gear 2' comes opposite pinion 7 and gear 2' and is freed from the latter, whereupon segment 16 which is moving with gear 12 again comes into mesh with rack 15 (Fig. 7) which is then receiving the converted movement of crank 14 at a speed equal to that of the uniform speed of movement of the bed; and while the gear 2' is freed from pinions 7 and 8, the rack 15 and segment 16 have control of the bed and first slow down and stop the bed driving gear 12, and then reverse its motion (Fig. 6) and accelerate the same until gear 2' again acquires a peripheral speed equal to the peripheral speed of pinion 8, such gear and pinion being at that time rotating in complementary directions. The pinions 7 and 8 are meanwhile shifted on shaft 9, so that, just as or before the segment 16 and rack 15 again lose control of the bed, the teeth of gear 2' again come into mesh with pinion 8, which latter continues to drive gear 2' in the direction in which bed gear 12 is then rotating for a little over two-thirds of a revolution of gear 2'; then the segment 16 and rack 15 again take control of the bed, when gear 2' is freed from both pinions 7 and 8. In this example the bed gear 12 makes practically one revolution to move the bed a complete stroke in either direction, including the slowing down of the bed from its maximum or uniform speed to its period of rest at each end of the stroke. The relative speed of movement of the bed, as compared with the speed of rotation of gear 2' can, of course, be varied by varying the size of the gears 2' or 12. The length of movement imparted to the bed for each rocking movement of the shaft 6 can be varied by changing the size of the gear 12.

Figure 8:
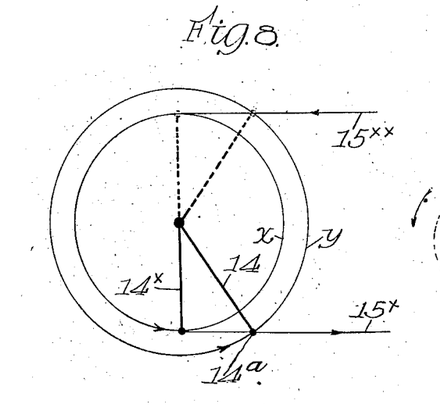
Fig. 8 is a diagrammatic illustration of two crank movements produced by cranks of different lengths—one having a greater and the other the same arcual speed as the maximum speed of the bed.
Figure 9:
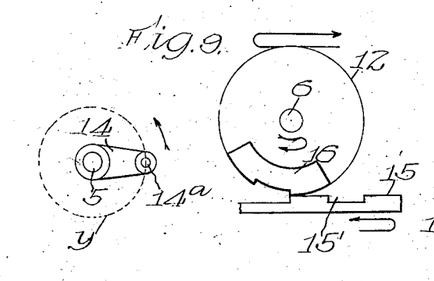
Figs. 9 to 13 are diagrammatic views showing the various positions the crank and the rack segment assume during a cycle of the machine.

The principal point of difference between the present invention and what is described and claimed in the aforesaid former application, specifically speaking with reference to this particular embodiment of the invention, consists in making the speed of arcual travel of the crank pin 14ᵃ greater than the speed of uniform travel of the bed, and so proportioning and organizing or arranging the parts that the rack 15 and segment 16 do not commence to engage until the converted movement of the crank as applied to the rack 15 is reduced to a speed equal to the maximum or uniform speed of the bed; or in other words, to the peripheral or pitch diameter speed of the bed gear 12. This can best be understood from the diagrammatic illustration in Fig. 8. The circle $x$ represents the arcual travel of a crank 14ˣ which is equal in speed to the maximum speed of the bed, and consequently this circle may also represent the pitch diameter of bed gear 12, and $y$ represents the line of arcual travel of the crank 14, which is longer than crank 14ˣ and whose speed consequently exceeds the maximum or uniform speed of the bed, while the lines 15ˣ and 15ˣˣ represent the line of the to-and-fro converted movement of the crank 14ˣ, such converted movement it being understood, being represented at the maximum speed resulting from the action of the crank upon a device like the Scotch yoke 15ᵇ, at the time when the crank is at right angles to the line of its converted movement. In the case of the shorter crank 14ˣ it is apparent that since its speed of arcual movement is the same as the pitch diameter speed of bed gear 12, its converted movement must take control of the bed and surrender it again when at its maximum speed, or when the crank 14ˣ is at right angles to the lines 15ˣ and 15ˣˣ; but in the case of the longer crank 14 it is apparent that since its speed of arcual travel exceeds the peripheral speed of the bed gear 12 at these points, the constant speed bed driving mechanism may maintain control of the bed until the crank 14 passes beyond the present full line position of the shorter crank 14ˣ and may assume control again before it (crank 14) arrives at the dotted line position of crank 14ˣ, the positions of the longer crank 14 where it assumes and surrenders control of the bed being represented in Fig. 8 by full and dotted lines respectively.

Theoretically the speed of the converted movement of the longer crank 14 becomes the same as the maximum speed of the bed at the points of intersection of the lines $y$ and 15ˣ and 15ˣˣ, which latter are tangent to the circle $x$. Hence it is seen that the point in the arcual travel of the crank pin 14ᵃ (the crank turning counter-clock-wise), where the crank assumes control of the bed will occur at one end of the stroke at a point between the vertical and horizontal diameters of the circle $y$, and in the lower right hand quarter of that circle (see Fig. 5) and at the other end of the stroke it will occur at a corresponding point in the upper left hand quarter of such circle, (see Figs. 7 and 11), and in each instance the point will be more or less removed from the vertical diameter accordingly as the speed of the crank pin 14ᵃ exceeds the maximum speed of the bed. As the point in the line of travel $y$ where the crank 14 assumes control of the bed is removed from the vertical diameter of such circle, so also will the point in said line of travel where the crank surrenders control be removed from such diameter, and consequently by increasing the speed of the crank over the maximum speed of the bed the length of uniform travel of the bed may be correspondingly increased while maintaining, if desired, the same ratio between the number of revolutions of the crank and the bed gear 12, as heretofore. The degree which the speed of the crank pin may be increased over and above the speed of the bed will vary with the size and weight of the parts, and other conditions. In every instance, however, it will be seen that the parts should be so proportioned and arranged that the rack 15 will commence to engage with the segment 16 (when the bed is moving toward the left, as in Fig. 5), after the crank pin 14ᵃ has passed the vertical diameter of the circle it described, turning counter-clock-wise, and the rack and segment should disengage before the crank pin arrives at such vertical diameter in the upper right hand quarter of such circle (see Fig. 10). Consequently the gear 2′ in conjunction with one or the other of gears 7, 8 maintains control of the bed and moves it at a constant or uniform speed throughout a much greater portion of its entire stroke than would be possible should the rack 15 and segment 16 be brought into engagement at a time when the crank is at right angles to the line of its converted movement. The uniform stroke of the bed being thus increased, it of course follows that the type surface carried by the bed may be accordingly increased in length, and the cylinder C may be maintained in contact with the bed a correspondingly increased length of time.

Figure 10:
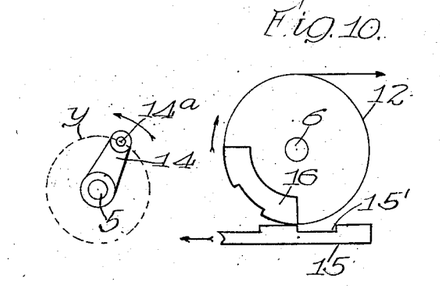
Figure 11:
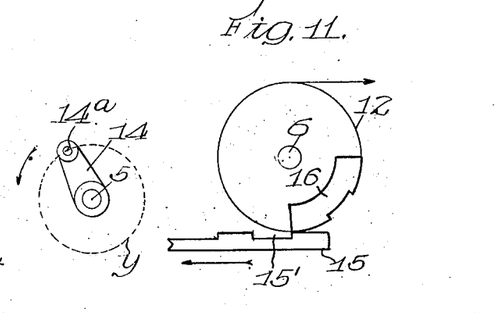
Figure 12:
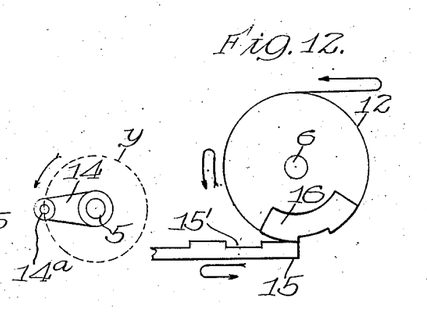
Figure 13:
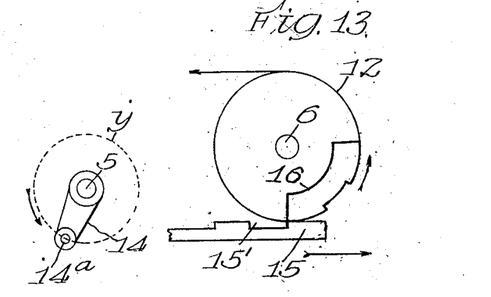

Figs. 9 to 13 represent the principal positions of the crank segment 16 and rack bar 15, assumed from the time the bed starts its stroke to the right until it has completed its right hand stroke and has started back on its left hand stroke. At the time when the right hand stroke of the bed is commencing (Fig. 9) the crank 14 is parallel with the rack bar 15, that is, is parallel with the line of its converted movement and the bed segment 16, pinion 12 and rack bar 15 are at rest, with the rack bar 15 in engagement at its left hand end with the right hand end of segment 16. As the crank 14 now moves counter-clock-wise it pulls the rack bar 15 toward the left and starts the bed on its right hand stroke. By the time the crank arrives at the position shown in Fig. 10, which corresponds to the dotted line position of the longer crank 14 in Fig. 8, where the converted speed of the crank becomes the same as the uniform speed of the bed and the same as the peripheral speed of the cylinder C, the rack 15 and segment 16 disengage; or, in other words, the rack draws away from the segment at the instant the bed gear 12 is taken possession of by the pinion 7, and its uniform stroke thereby commenced. The bed pinion 12 continues to rotate clockwise and the crank 14 counter-clock-wise until the crank makes a complete revolution back to the position shown in Fig. 9, and passes as far beyond the vertical diameter of the circle it describes as the position of the crank in Fig. 10 is removed from such vertical diameter. This point, as before explained, will of course vary with the difference in arcual speed of the crank and uniform speed of the bed. The point is represented in Fig. 11, and it is the place where the uniform right hand stroke of the bed ceases and the reversing right hand stroke commences, that is, the crank commences to slow down the bed. At this position it will be seen that the bed gear 12, still turning clock-wise, brings its segment 16 into engagement with the right hand end of rack bar 15, the segment and rack bar at this instant being moving in the same direction and at the same rate of speed. The right hand end of the rack bar thereupon takes possession of the segment and, through the segment and other connections, of the bed; slowing down the right hand stroke until the crank arrives at the horizontal position shown in Fig. 12, when the right hand stroke will be complete and the bed pinion 12, segment 16 and rack 15 will be at rest. As the crank comes down around its lower quarter revolution it pushes the rack bar 15 back again toward the right, reversing the direction of rotation of the bed gear 12, turning it counter-clock-wise until the position shown in Fig. 13 is reached, where the speed of the converted movement of the crank pin commences to exceed the maximum speed of the bed, and the uniform left hand stroke of the bed also commences. The rack bar 15, although traveling in the same direction as the segment 16 when the position shown in Fig. 13 is reached, travels at a much greater speed than the segment, and in order that segment and rack bar may not clash at this time, the intermediate teeth of the rack bar are cut away, as shown at 15′, to allow the rack bar to pass the segment; or, in other words, the rack bar is formed of two spaced series of teeth. The segment 16 may likewise be formed, if desired, as teeth intermediate of these series would not be used.

It will thus be seen that the invention provides a bed driving mechanism, having a constant speed element in the form of the pinion 7 or 8 for driving the bed throughout a portion of its stroke, and a bed reversing mechanism for taking control of the bed at the ends of the constant or uniform portion of its stroke, also embodying a constant speed element in the form of the crank pin 14ᵃ traveling at a greater rate of speed than the maximum speed of the bed, and a variable speed element constituted by the rack bar 15, traveling at a rate of speed gradually increasing from a point of rest to the speed of the element 14ᵃ and coöperating with a means such as segment 16 for transmitting this converted variable movement of the element 14ᵃ to the bed when the speed of element 15 decreases to an equality with the maximum speed of the bed or the peripheral speed of pinions 7 or 8.

What I claim is:

1. In a machine for the purpose described, the combination of a reciprocatory bed; bed driving mechanism for driving the bed throughout a portion of its stroke; bed reversing mechanism for reversing the movement of the bed at the ends of its stroke, embodying a constant speed element having a speed exceeding the maximum speed of the bed; and means for converting such constant speed into a variable speed, increasing from a point of rest to a speed equal to the speed of said constant speed element, and means for imparting said variable speed to the bed when it commences to be less than the speed of such constant speed element and continuing to impart it thereto until it again commences to be greater than the speed of such constant speed element.

2. In a machine for the purpose described, the combination of a reciprocatory bed; bed driving mechanism for driving the bed throughout a portion of its stroke; bed reversing mechanism for reversing the movement of the bed at the ends of its stroke, embodying a variable speed element whose speed decreases from a speed greater than the maximum speed of the bed to a point of rest, and increases from such point of rest to a speed greater than the maximum speed of the bed, and means for connecting said element with the bed when its speed decreases to a speed equal to the maximum speed of the bed, and again disconnecting it from the bed when its speed increases from said point of rest to a speed equal to the maximum speed of the bed.

3. In a machine for the purpose described, the combination of a reciprocatory bed; bed driving mechanism for driving the bed throughout a portion of its stroke; bed reversing mechanism for reversing the movement of the bed at the ends of its stroke, embodying a revolving element having a uniform rate of arcual travel, whose speed is greater than the maximum speed of the bed; means for converting the uniform movement of said element into a variable movement, increasing from a point of rest to a speed equal to the speed of arcual travel of said element, and means for imparting said variable movement to the bed during the period said variable movement is equal to and less than the maximum speed imparted to the bed by said bed driving mechanism.

4. In a machine for the purpose described, the combination of a reciprocatory bed; bed driving mechanism for driving the bed uniformly throughout a portion of its stroke; bed reversing mechanism for reversing the movement of the bed at the ends of its stroke, embodying a revolving element moving at a uniform speed greater than the speed imparted to the bed by said bed driving mechanism, a Scotch yoke engaged by said revolving element for converting the movement of the latter into a rectilinear movement, and means for imparting the movement of said Scotch yoke to the bed when the speed of said rectilinear movement becomes equal to the speed imparted to the bed by said bed driving mechanism.

5. In a machine for the purpose described, the combination of a reciprocatory bed; bed driving mechanism for driving the bed uniformly throughout a portion of its stroke; bed reversing mechanism for reversing the movement of the bed at the ends of its stroke, embodying a revolving crank having an arcual speed of travel greater than the speed imparted to the bed by said bed driving mechanism, a Scotch yoke engaged by said crank for converting the movement of the crank into a reciprocatory movement, varying in speed from a point of rest to a speed greater than the speed imparted to the bed by said driving mechanism, and means for imparting the movement of said yoke to the bed when its speed decreases to a speed equal to the speed imparted to the bed by said driving mechanism.

6. In a machine for the purpose described, the combination of a reciprocatory bed; bed driving mechanism for driving the bed uniformly throughout a portion of its stroke; bed reversing mechanism for reversing the movement of the bed at the ends of its stroke, embodying a crank having an arcual speed of travel greater than the maximum speed imparted to the bed by said bed driving mechanism, a Scotch yoke engaging said crank for converting the movement thereof into reciprocatory motion, and a rack bar connected with said yoke, and a revolving segment operatively connected with the bed and adapted to be engaged by said rack bar when the speed of the latter decreases to a speed equal to the speed imparted to the bed by said bed driving mechanism.

7. In a machine for the purpose described, the combination of a reciprocatory bed; bed driving mechanism for driving the bed throughout a portion of its stroke; bed reversing mechanism for reversing the movement of the bed at the ends of its stroke, embodying a revolving crank having a speed of arcual movement greater than the speed imparted to the bed by said bed driving mechanism, and a rack bar reciprocated by said crank and having spaced series of teeth, and means for imparting the movement of said rack bar to the bed when the speed of such movement decreases to a speed equal to the speed imparted to the bed by said bed driving mechanism, embodying a revolving segment, adapted to be engaged by said rack bar.

8. In a machine for the purpose described, the combination of a reciprocatory bed; bed driving mechanism for driving the bed throughout a portion of its stroke, embodying oppositely rotating constant speed pinions, a mutilated gear operatively connected with the bed for imparting reciprocatory motion thereto, means for driving said mutilated gear by said pinions alternately, whereby constant or uniform movement is imparted to the bed throughout a portion of its stroke alternately in opposite directions; bed reversing mechanism for reversing the movement of the bed at the ends of its stroke, embodying a variable speed element whose speed increases from a point of rest to a speed greater than the peripheral speed of said pinions, and means for imparting the movement of said element to the bed during the period its speed is equal to and less than the peripheral speed of said pinions.

In testimony whereof I have signed my name to this specification, in the presence of two subscribing witnesses, on this 2nd day of June, A. D. 1911.

MICHAEL ANDREW DROITCOUR.

Witnesses:
CHARLES H. SEEM,
K. W. WOUNELL.